United States Patent [19]
Labiche

[11] Patent Number: 5,491,880
[45] Date of Patent: Feb. 20, 1996

[54] METHOD AND APPARATUS FOR REPAIRING A SECTION OF PIPELINE

[76] Inventor: Jean-Pierre Labiche, 35 Rue de la Ferme, 92200 Neuilly-sur-Seine, France

[21] Appl. No.: 305,930

[22] Filed: Sep. 19, 1994

Related U.S. Application Data

[63] Continuation of Ser. No. 30,243, May 13, 1993, abandoned.

[30] Foreign Application Priority Data

Sep. 14, 1990 [FR] France ................... 90 11377

[51] Int. Cl.⁶ ..................................... B23P 6/00
[52] U.S. Cl. ................... 29/402.09; 29/402.18; 156/97; 156/282; 156/392; 156/425
[58] Field of Search .......................... 29/402.01, 402.09, 29/402.18; 242/7.23, 7.21, 7.22; 57/3, 10; 156/97, 187, 282, 311, 392, 425, 498

[56] References Cited

U.S. PATENT DOCUMENTS

| | | |
|---|---|---|
| 2,924,546 | 2/1960 | Shaw . |
| 3,470,057 | 9/1969 | Stuart, Jr. et al. . |
| 3,890,182 | 6/1975 | Terry ........................... 242/7.23 |
| 4,085,427 | 11/1977 | Wilson . |
| 4,261,785 | 4/1981 | Hunter . |
| 4,514,245 | 4/1985 | Chabrier . |
| 4,558,971 | 12/1985 | David ........................... 405/158 |

FOREIGN PATENT DOCUMENTS

| | | |
|---|---|---|
| 3539898 | 4/1987 | Germany . |
| 1025319 | 4/1966 | United Kingdom . |

*Primary Examiner*—David P. Bryant
*Attorney, Agent, or Firm*—Young & Thompson

[57] ABSTRACT

A repair of a hollow tubular member adapted to contain a fluid under pressure, is performed by securing to the hollow tubular member to be repaired one end of a flexible tape consisting of continuous longitudinal fibers that occupy from 30–60% of the cross section of the tape, the fibers being encased in a thermoplastic matrix, the elastic limit of the material of the fibers being greater than the elastic limit of the material of the tubular member. The tape is caused to revolve around the tubular member while displacing the tape axially along the tubular member in order to wind the tape around the tubular member in a helix. The tape is heated immediately prior to its application to the tubular member and is cooled immediately following its application to the tubular member. The tape is unwound from a coiled supply of the tape and is braked between the tubular member and the coiled supply at a point spaced from the coiled supply thereby to impart to the tape a substantially greater tension between that point and the tubular member than between the coiled supply and that point. The tape can be a flexible strip consisting of an aluminum matrix coating fibers of steel.

8 Claims, 4 Drawing Sheets

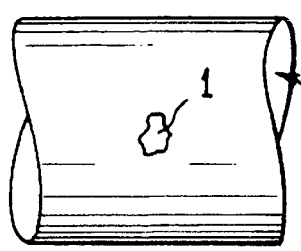
FIG_1
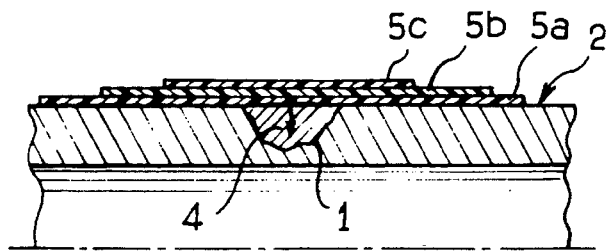
FIG_2
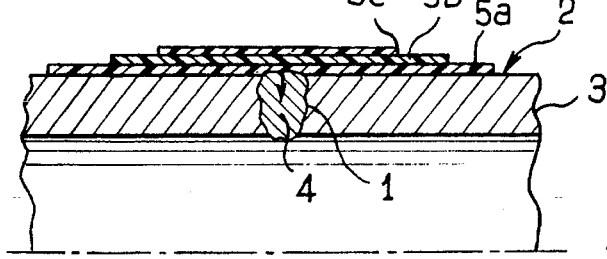
FIG_3
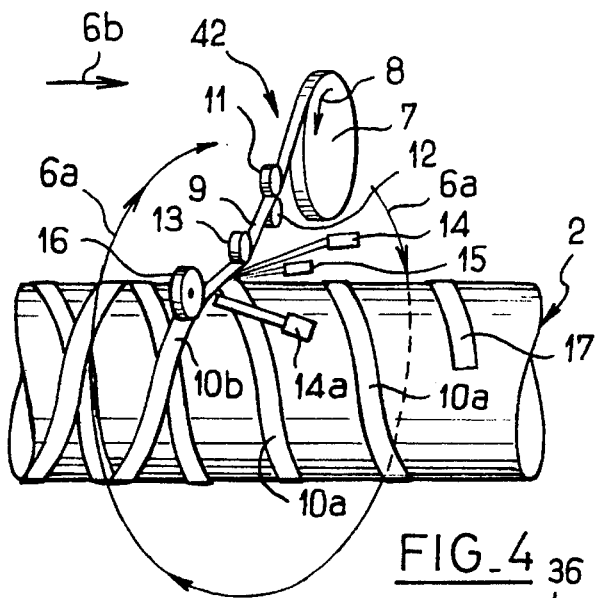
FIG_4
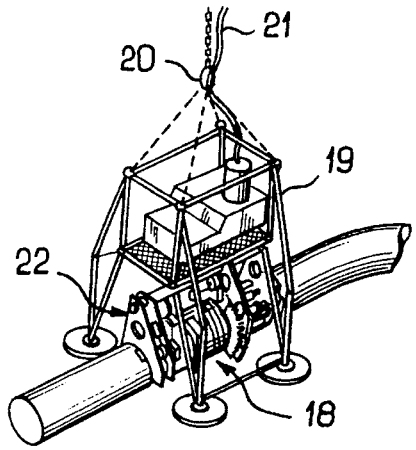
FIG_5
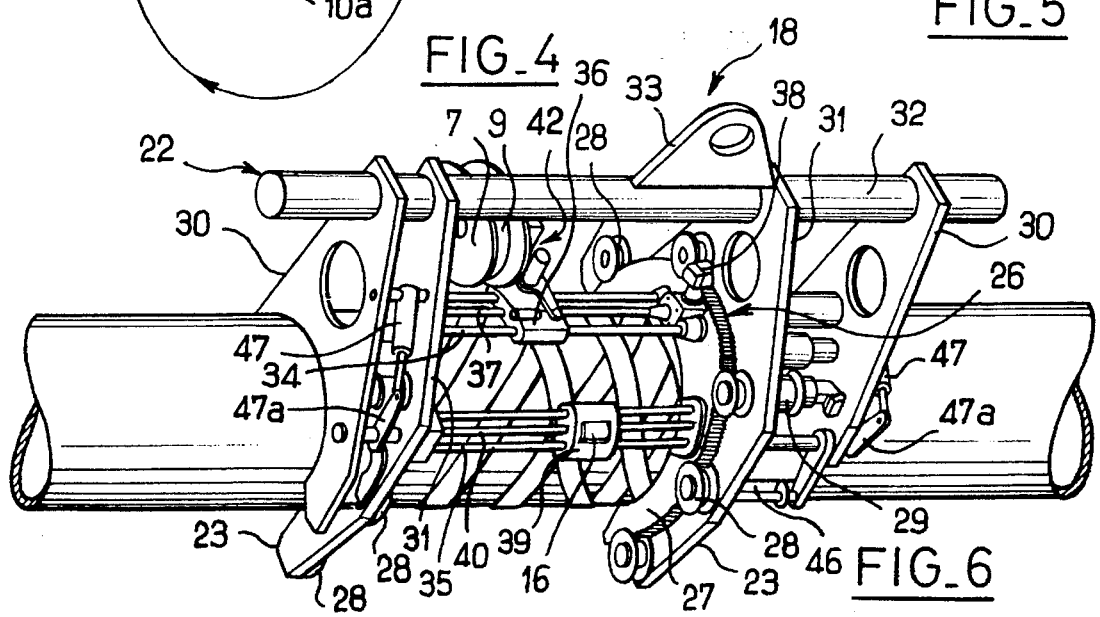
FIG_6

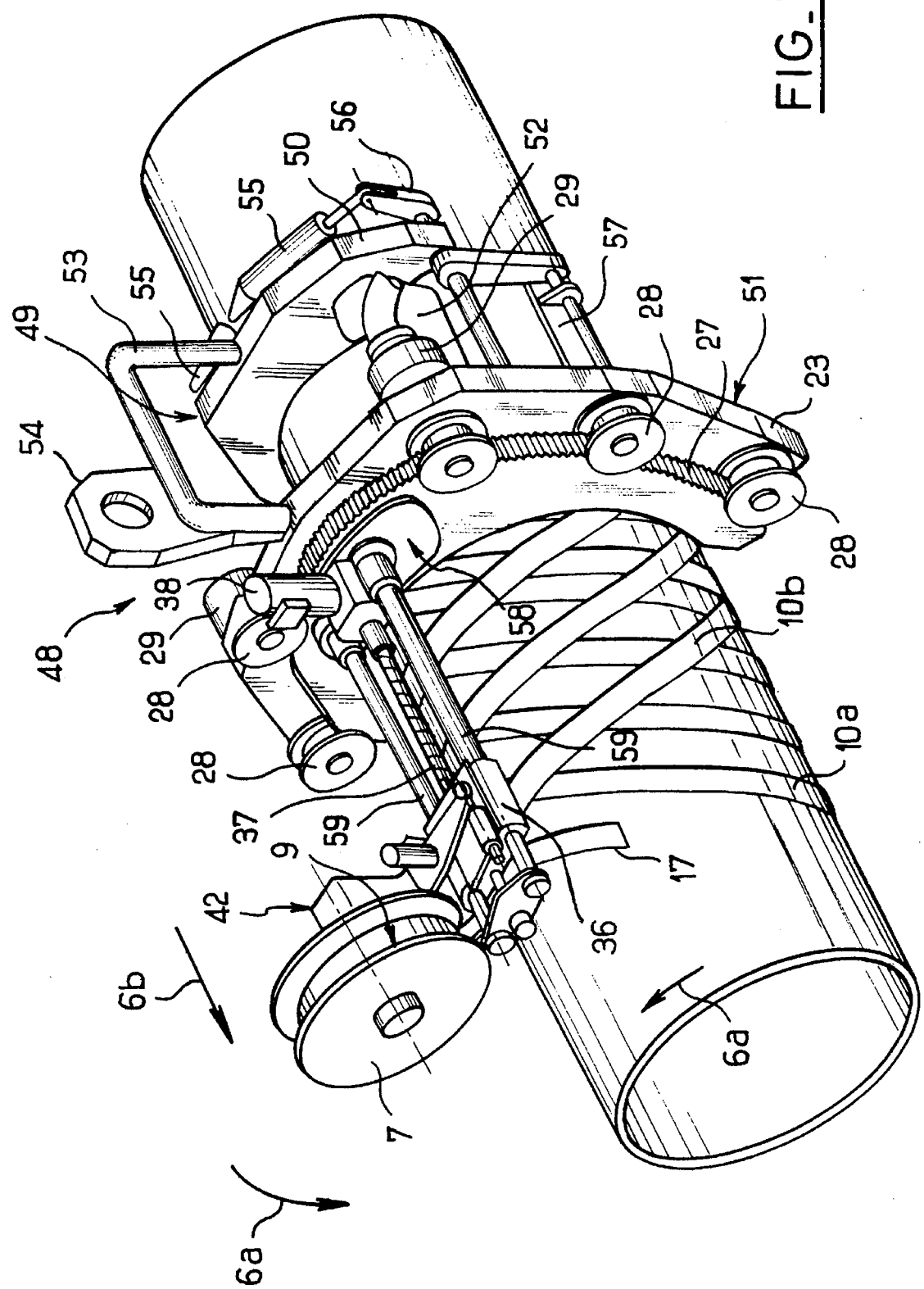
FIG_7

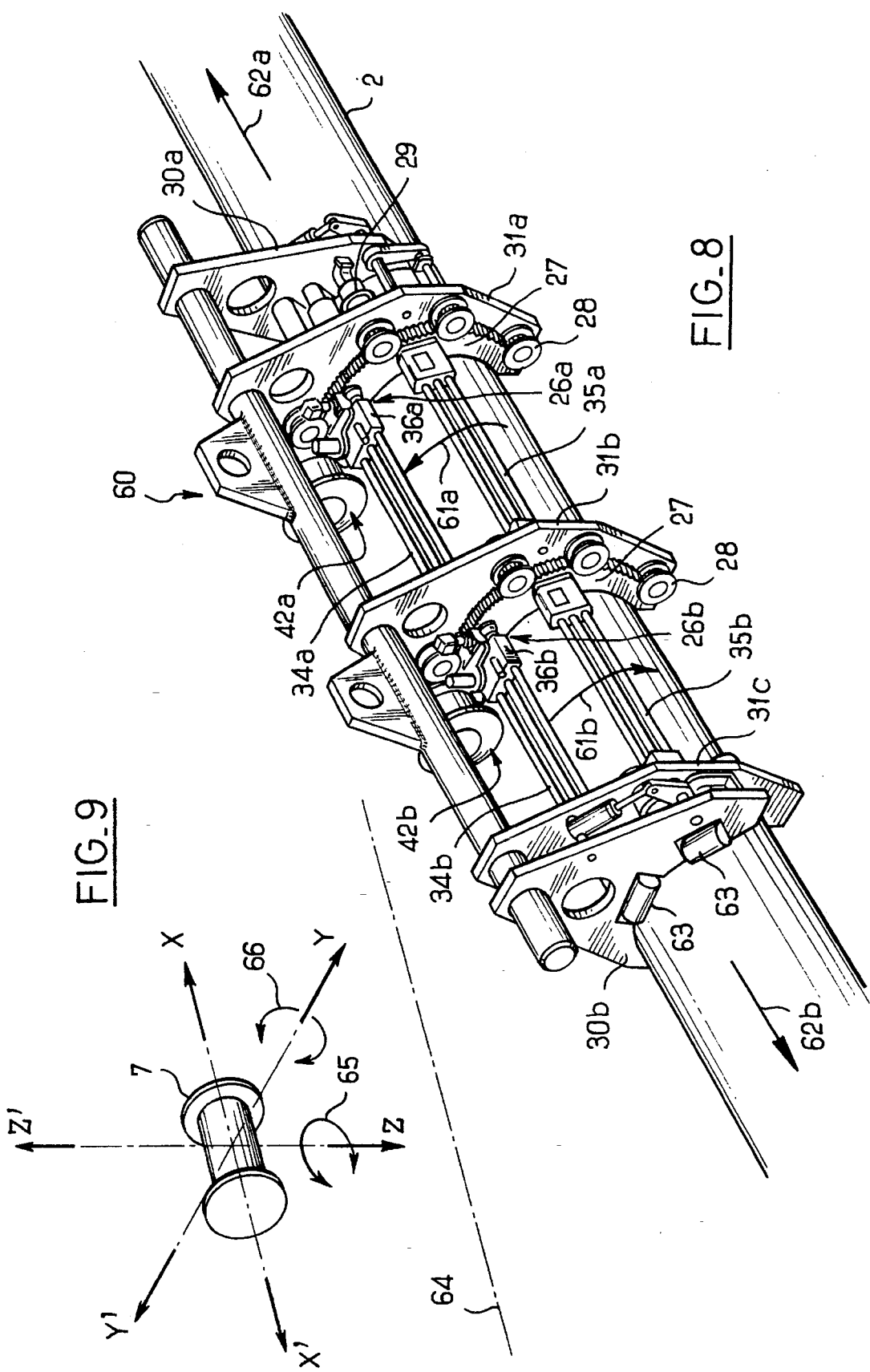

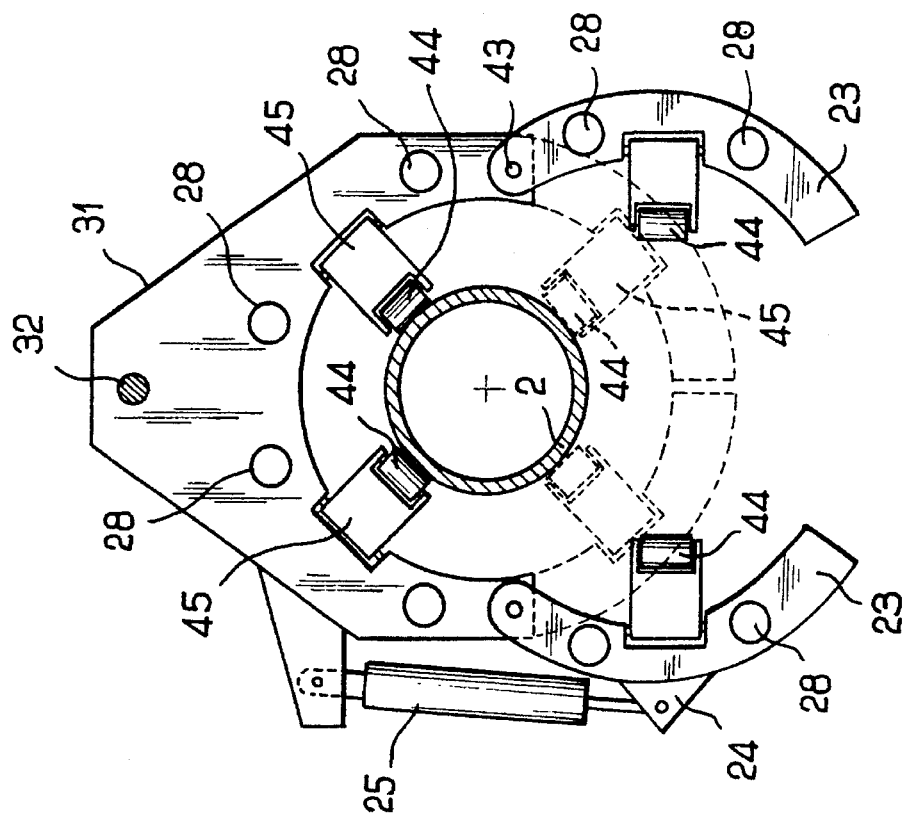
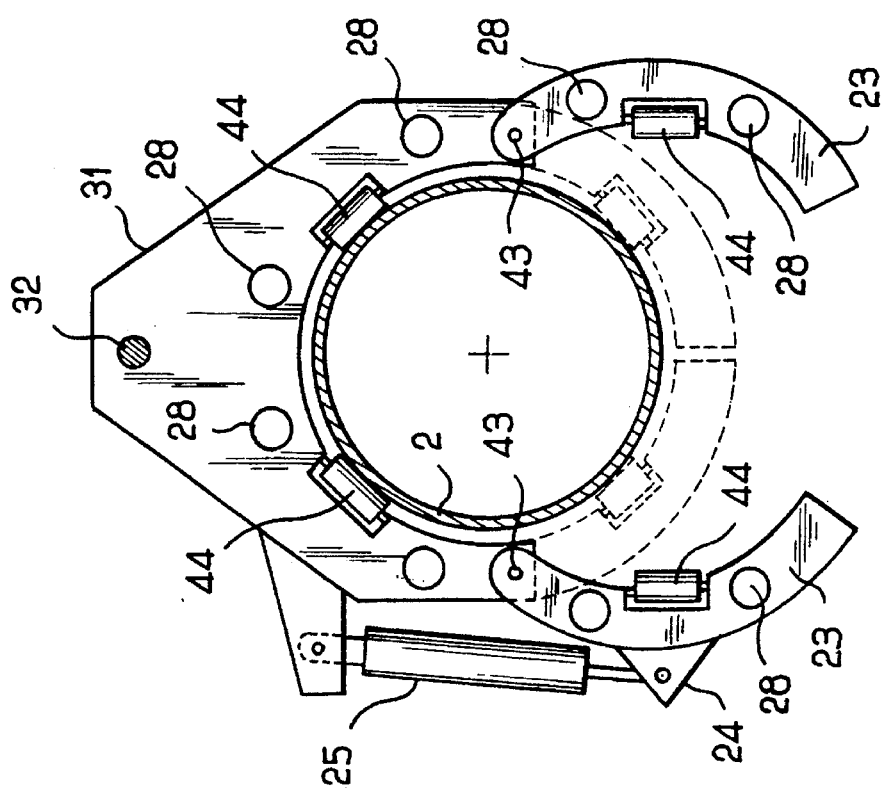

METHOD AND APPARATUS FOR REPAIRING A SECTION OF PIPELINE

This application is a continuation of application Ser. No. 08/030,243, filed May 13, 1993, now abandoned.

The present invention relates to a method for repairing or reclaiming, in situ, a section of a pipeline or container intended to contain or containing a fluid under pressure.

The present invention also relates to a device for implementing this method.

Various methods are known for repairing or reclaiming, in situ, a section having a fault of any origin or nature whatsoever, corrosion, fissure, removal of material, through hole, with or without deformation, etc., on a pipeline or container intended to receive a fluid under pressure.

It is thus known, for example, after, if appropriate, having repaired the actual fault and re-established the outline of the pipeline or container, how to prepare and assembly solidly to each other and onto the latter two half-shells designed for restoring the strength and leak-tightness of this pipeline or container. Such an operation is laborious and delicate when it is carried out at the ground surface; it is all the more so if a pipeline or container laid or buried on the seabed is involved.

Moreover, various methods are known for externally and uniformly reinforcing tube elements or cylindrical containers, generally made from steel, before installing or mounting them.

According to these methods, the tube elements or the individual containers are made to revolve on themselves before being assembled, and high-strength steel wires or tapes or flexible strips are wound around the entire peripheral surface of the latter, with or without tension, in order to increase the strength of the tubes or of the containers with respect to the internal pressures and/or their resistance to centrifugal forces.

The object of all these methods is to produce pipelines or containers capable of withstanding increased internal pressures or, for the same pressure, of reducing the thickness of metal necessary with the purpose of lightening the latter.

In these methods, a flexible strip is generally wound around the hollow body in substantially adjoining turns, by causing said hollow body to revolve upon itself and this strip is fastened to the hollow body. The strips used are made up of a material whose elastic limit is greater than that of the material of said hollow body.

According to one of these methods, during the winding a slight tension is applied to a strip made up of glass fibers embedded in a synthetic resin. This method makes it possible to obtain excellent protection against corrosion, the fibers embedded in the synthetic resin being securely fastened to the hollow body reinforced over its entire surface. The slight tension applied implies, taking into account the difference between the respective elastic moduli of steel and of glass, which are the materials most commonly used, a hydraulic expansion of the reinforced hollow body in order to make use of all the strength of the glass.

According to another method, a flexible tape is wound with a sufficient tension so that, when the hollow body is pressurized, the stresses likely to be exerted in the hollow body and in the windings of said strip reach their maximum permissible value at substantially the same time.

In all cases, the metal is prestressed uniformly over the entire length of the pipeline or container so as to be stressed permanently in substantially the same way at any point on the latter under all conditions of use of the latter: construction, tests at proof pressure, normal use. It is thus possible to ensure that any stress gradient likely to lead to a fatigue fracture of the metal is prevented.

These methods apply neither to a pipeline or container which is already installed and in service, nor to a localized implementation on site, at ground level or on the seabed, on a section of such a pipeline or container.

The object of the invention is to overcome the drawbacks of the known methods and to propose a method of the aforementioned type whose implementation is simple, effective and economical at any point whatsoever in an existing installation.

Another object of the invention is to propose a device for implementing the method of the invention.

According to the invention, the method of the aforementioned type is one which comprises the following steps:

a) if necessary, any possible fault whatsoever in said section is blocked off by means of a blocking-off material;

b) the front end of a flexible strip of very high longitudinal mechanical strength made up of continuous longitudinal fibers representing, in cross section, from 30 to 60% of the cross section of the strip, coated in a thermoplastic matrix, and whose elastic limit is greater than that of the pipeline or container material, is fixed with respect to the external peripheral surface of the pipeline or container;

c) means for supplying the flexible strip are made to revolve around the pipeline or container, and are displaced axially along the latter, in a to-and-fro movement, from one end of said section to the other and beyond:

d) said flexible strip is wound around the pipeline or container under tension following successive crossed-over helixes with predetermined coiling angles, at the point and in the vicinity of said section on either side of the latter, heating said strip in order to make the thermoplastic material of the matrix of the strip melt throughout substantially its entire mass, just before it is applied to said peripheral wall or to a previously laid-down layer of said strip, and immediately cooling said strip as soon as it is applied in order to resolidify said matrix, and homogeneous layers are thus built up over the entire surface of said section, then the rear end of the strip is fastened with respect to said pipeline or container;

e) the number of layers of the strip superposed at the same point as well as the winding angles and tension of the strip being sufficient to prestress the material of the pipe,line or container both radially and longitudinally, and thus to restore predetermined mechanical characteristics to said section of the pipeline or container.

Thus, simply by winding a flexible strip under tension around a section of an existing pipeline or container having a fault, which flexible strip can obviously be laid down in several layers, a localized reinforcement having the desired strength may be produced on this section.

The strip is thus laid down under tension in successive crossed-over helixes with predetermined coiling angles: the corresponding segments of the strip exert, on the material of the section to be repaired, a prestress which is both longitudinal and radial, making it possible to more than compensate for the loss in characteristics of said section brought about by the fault to be repaired.

The fact that the thermoplastic material of the matrix is melted throughout its entire mass means that the aforementioned segments are deformed in the region of the cross-overs in order completely and homogeneously to cover the entire periphery of said section. Cooling is then carried out as soon as the strip has been applied, in order to prevent any migration of the fibers through the heat-curable matrix.

The strip is thus coiled under the foreseen tension which in turn brings about the aforementioned prestress without deterioration of the properties of the strip.

The advantage of the present invention is precisely to have overcome the precedent according to which reinforcing a hollow body by prestressing said hollow body by winding a flexible strip had necessarily to be continuous and homogeneous in order not to introduce, into the material of said hollow body, stress gradients likely to weaken the strength of the latter, and to have analyzed the problems posed by repairing a fault in order to adapt to this operation the process of winding a flexible strip.

It will be understood that the method of the invention may be implemented easily in the field at any point whatsoever of an existing installation on the ground as on the seabed.

According to an advantageous version of the invention, the strip is pressed onto the peripheral wall of the pipeline or container as soon as it has been applied to said wall or to a previously laid-down layer of said strip.

Any bubble of air or gas trapped between the wall of the pipeline or container and the various superposed layers of strip is thus eliminated, and the material of the strip is made to flow slightly in order to obtain a perfect join between two segments of tape in contact with each other, so as to cover and reinforce completely and homogeneously the wall of the pipeline or container and to ensure perfect leak-tightness, as well as excellent protection against corrosion.

According to a preferred version of the invention, winding is carried out so that the prestress exerted on the material of the pipeline or container decreases progressively from a predetermined point when moving away from said repaired or reinforced section on either side of the latter.

The local prestress gradient and therefore the internal stresses due to this gradient are thus decreased, so as to reduce the fatigue of the metal on either side of the repaired or reinforced section.

According to another aspect of the invention, the device for repairing or reclaiming, in situ, a section of a pipeline or container intended to contain or containing a fluid under pressure, according to the method in accordance with the invention, is one which comprises:

- a chassis intended to bear on the pipeline or container and/or on the ground,
- means for fastening the chassis to the pipeline or container and centering it with respect to the latter,
- equipment which can move with respect to the chassis and which is intended to revolve around the pipeline or container;
- means for causing the moving equipment to revolve with respect to the chassis around the pipeline or container;
- the moving equipment comprising means which can move axially to supply a flexible strip and means for winding said flexible strip around the pipeline or container under tension following successive crossed-over helixes with predetermined coiling angles when the moving equipment revolves around said pipeline or container,
- means for heating said strip in order to make the thermoplastic matrix of the strip melt throughout its entire mass before said strip is applied, and means for immediately cooling said strip as soon as it is applied in order to resolidify said matrix.

Other characteristics and advantages of the invention will emerge in the detailed description hereafter.

In the appended drawings, given by way of non-limiting examples:

FIG. 1 is a partial diagrammatic view from above of a section of a pipeline having a fault to be repaired;

FIG. 2 is a partial view in longitudinal section of the pipeline of FIG. 1, after repair, the fault not passing through the wall of the pipeline;

FIG. 3 is a view similar to FIG. 2, the fault passing through the wall of the pipeline;

FIG. 4 is a diagrammatic view illustrating the sub-assembly for winding the flexible strip around the pipeline;

FIG. 5 is a diagrammatic view in perspective representing the implementation of a device according to a first embodiment of the invention;

FIG. 6 is an enlarged view in perspective of the device of the FIG. 5;

FIG. 7 is another enlarged view in perspective of another embodiment of the device in accordance with the invention;

FIG. 8 is a view similar to FIG. 6 of another embodiment of the device of the invention;

FIG. 9 is a graph diagrammatically representing the possible movements, along five axes, of the winding sub-assembly with respect to the carriage and the chassis in another embodiment of the invention;

FIG. 10 is a diagrammatic front view of an articulated fork of the chassis in position on a pipeline whose diameter is the maximum diameter envisaged for this fork;

FIG. 11 is a view similar to FIG. 10, the fork being in position on a pipeline whose diameter is the minimum diameter envisaged for this fork.

FIG. 1 represents a fault 1 on a pipeline 2 intended to contain or containing a fluid under pressure, especially any pressurized gas whatsoever such as natural gas for example, or any pressurized liquid whatsoever, such as water, crude oil, a petroleum product, a heat transfer liquid for example. Such pipelines are commonly encountered in the natural gas and oil industry, chemistry, the nuclear industry, the processing and transportation of steam or hot water, for example. Such a pipeline 2 is generally made from steel. It may be laid on the ground or buried. It may be laid or buried on the seabed or at the bottom of any stretch of water whatsoever.

The fault 1 may be of any nature and origin whatsoever. It may have been brought about by corrosion, by metal fatigue, by a blunt external object. It may thus involve a fissure, a removal of metal, a hole passing through the wall of the pipeline. In these latter cases, the edges of the fault may or may not be deformed. The fault may be on the external face or on the internal face of the pipeline 2.

Such a pipeline generally comprises a protection coating, in particular a corrosion protection coating. A sub-sea pipeline further comprises an external concrete coating acting as ballast.

Before any repair of a fault, the pipeline is previously relieved of its protection coating, surface-treated, for example by sand blasting, trimming, brushing, etc., then coated with a primary layer facilitating the adherence of a reinforcement element, and also ensuring protection against corrosion, all this being carried out in a manner known per se.

If necessary, the pipeline or container has dents or bumps removed from the inside, for example by means of a "pig" pushed by the pressure of the fluid inside this pipeline or container in order to re-establish the initial internal outline of the latter. Use may also be made of any other known means such as thrust cylinders, jacks, etc., especially if the edges of the fault are deformed toward the outside of the pipeline.

In the case of a sub-sea pipeline, the removal of the ballast and of the protection coating generally takes place in the water, then all the repair operations are preferably carried out under a diving bell.

The invention in the case of pipeline will be described below, it being specified that all that which is to be described with reference to this pipeline may be applied to any pressurized container whatsoever, which does not necessarily have to be asymmetric. The asymmetric shape is, however, preferred insofar as it allows an even and homogeneous reinforcement, another shape making it necessary to use additional safety coefficients in order to compensate for the irregularities and losses of homogeneity. It is also assumed that said pipeline is made from steel, it being clearly understood that the invention may be applied and may easily be adapted to a pipeline or container made from any material whatsoever, for example concrete.

The method of the invention may be implemented on a pipeline or container in use or under pressure since the section to be repaired or reclaimed does not comprise any fault passing through the thickness of the latter. This pipeline or container must have an external diameter preferably greater than approximately 100 mm.

The method for repairing or reclaiming, in situ, a section of a pipeline intended to contain or containing a fluid under pressure, is one which comprises the following steps:

a) if necessary, any possible fault whatsoever in said section is blocked off by means of a blocking-off material;

b) the front end of a flexible strip of very high longitudinal mechanical strength made up of continuous longitudinal fibers representing, in cross section, from 30 to 60% of the cross section of the strip, coated in a thermoplastic matrix, and whose elastic limit is greater than that of the pipeline or container material, is fixed with respect to the external peripheral surface of the pipeline or container;

c) means for supplying the flexible strip are made to revolve around the pipeline or container, and are displaced axially along the latter, in a to-and-fro movement, from one end of said section to the other and beyond:

d) said flexible strip is wound around the pipeline or container under tension following successive crossed-over helixes with predetermined coiling angles, at the point and in the vicinity of said section on either side of the latter, heating said strip in order to make the thermoplastic material of the matrix of the strip melt throughout substantially its entire mass, just before it is applied to said peripheral wall or to a previously laid-down layer of said strip, and immediately cooling said strip as soon as it is applied in order to resolidify said matrix, and homogeneous layers are thus built up over the enquire surface of said section;

e) the number of layers of the strip superposed at the same point as well as the winding angles and tension of the strip being sufficient to prestress the material of the pipeline or container both radially and longitudinally, and thus to restore predetermined mechanical characteristics to said section of the pipeline or container.

Preferably, these predetermined mechanical characteristics are at least equal to those provided when the pipeline was designed.

In a known fashion, after repairing and possibly blocking off the fault (or faults), the conventional operations of surfacing the repaired zone, and laying down a primary coating serving both as a binding layer and as an anti-corrosion layer are carried out.

Winding is carried out so that the prestress exerted on the material of the pipeline decreases progressively from a predetermined point when moving away from said repaired or reclaimed section on either side of the latter.

The blocking-off material may extend radially outward with respect to the external peripheral surface of the pipeline.

When the strip is applied to a previously laid-down layer, this layer is itself preferably superficially mounted.

Finally, the strip is pressed onto the peripheral wall of the pipeline as soon as it has been applied to said wall or to a previously laid-down layer of said strip.

The number of layers of the strip superposed at the same point as well as the winding angles and tension of the strip must be sufficient for the blocking-off material and/or the material of said section of the pipeline to be prestressed when the pressure of the fluid inside the latter is equal to the proof pressure. However, the tape and especially the fibers of which it is composed will only be subjected to a stress level such that no perceptible relaxation arises during time. In the case of glass, the tension applied to the fibers will not exceed approximately 40% of their breaking strength.

The various helical segments of strip may be applied with one same coiling angle or with several coiling angles, determined so as to ensure the desired prestress both in the radial direction and in the longitudinal direction.

Under these conditions, a state of compression or prestress is maintained which makes it possible to restore leak-tightness and strength of the pipeline to the internal pressure whilst protecting it from corrosion and environmental aggression.

Indeed, it is easily understood, and calculation confirms it, that under such prestress, a fissure of the metal of the pipeline closes up and remains closed. Likewise, a plug blocking a hole passing through, or otherwise, the thickness of the pipeline is held in place on the one hand by the various layers of tape and, on the other hand, compressed by the metal located at the periphery of the hole and subjected to this prestress. Finally, for each layer, the adjoining turns connected to one another by the superficial melting of the internal face of the strip before laying down constitute a leak-tight jacket.

It is thus possible locally to reinforce a pipeline whose wall has been partially penetrated or even pierced.

It is also possible to reinforce, even slightly, over a great length, a pipeline which no longer has the required guarantees of safety.

Finally, in order to ensure absolutely risk-free transition between the good pipeline, in which the stress in use is tensile, and the repaired or reclaimed section, in which the stress in use is generally compressive, transition sections of a certain predetermined length, on which a prestress is produced which decreases progressively when moving away from the repaired or reclaimed section, are produced on either side of the actual section to be repaired. It is possible to calculate the values of this prestress and the length over which it decreases so that the internal stresses in the metal in these transition sections remain within levels which the metal can withstand without the slightest risk for the latter.

It should be noted that the excellent and rapid adherence of the strip to the pipeline or to a previously laid-down layer makes it possible easily to decrease the winding tension at each of the ends of each segment of strip laid down as a helix on each axial "to" or "fro" movement of the winding means (see below).

In the case in which the section to be repaired or reclaimed is contiguous with an accessory of the pipeline such as a valve, reinforcement or the like, of a thickness greater than that of the pipeline, the transition may be produced by a winding fading out on said accessory of greater thickness.

For this purpose, it is obviously possible to act at the same time or independently on the number of layers of the strip and the tension of the latter, which may both decrease progressively when moving away from the repaired or reclaimed section.

In the embodiments represented respectively in FIGS. 2 and 3, the faults 1, one of which, FIG. 3, passes through the wall 3 of the pipeline 2 whilst the other, FIG. 2, does not pass through it, are blocked by a plug 4.

The plug 4 is produced from any known material whatsoever: this may be added metal laid down by electric welding, for example. This may also be a plug made from a synthetic resin or any other material compatible with the metal of the pipeline 2.

The plug 4 is covered with three layers of reinforcement 5a, 5b, 5c, which will be described later.

In the embodiment of FIG. 4, a winding sub-assembly 42, mounted on moving equipment, not shown for the clarity of the drawing, revolves around the pipeline 2, in the direction indicated by the arrow 6a, and is displaced at the same time parallel to the pipeline 2 from left to right on the drawing in the direction of the arrow 6b in order to lay down a second segment as a helix 10b. This winding sub-assembly 42 has previously been displaced from right to left on the drawing in order to lay down a first segment as a helix 10a, which crosses the segment 10b, the respective coiling angles of the segments 10a, 10b being opposite. In the displacement to the left, the sub-assembly 42 will lay down a new segment which is offset with respect to the segment 10a and which will cross the segment 10b.

As a variant, it would also be possible to lay down a first homogeneous layer of parallel segments as a helix, such as 10a, by coiling during the displacements of the sub-assembly 42 in a single direction, then to lay down a second homogeneous layer of parallel segments such as 10b, by coiling during the sole displacements in the other direction.

The winding sub-assembly 42 comprises:

- a braked spool 7 which revolves in the direction of the arrow 8 when the winding sub-assembly 42 revolves in the direction of the arrow 6a. The spool 7 carries a flexible strip 9 which is unwound from the spool and is wound around the pipe 2 in order to form consecutive crossed-over segments as a helix 10a, 10b;

- a set of two rollers 11, 12 between which the flexible strip 9 is clamped and braked. These two rollers are, for example, coated with teflon at their periphery; they adjust the winding tension of the flexible strip 9;

- an angle guide 13, which defines the direction in which the strip 9 is applied to the pipeline 2. The angle guide 13 may be, for example, a small wheel or a roll coated at its periphery with teflon, or any bar, either fixed or revolving. The angle guide 13 has, at its periphery, a concave groove which receives the strip 9 and the concavity of which is directed outward. The angle guide 13 is particularly used to fit the winding sub-assembly 42 to pipelines of various diameters.

- means 14 for heating and melting, throughout substantially its entire mass, the thermoplastic material of the matrix of the flexible strip 9 just before said strip is applied to said peripheral wall of the pipeline 2 or a previously laid-down layer of strip, as well as for heating said pipeline or layer: it involves, for example, an electrical heating device or a blow torch with a reducing flame, of the oxyacetylene type, if the operation is to be carried out in the open air, or an electrical heating device or a hot gas blow torch operating, if necessary, under a diving bell enclosing a gas, which is preferably non-oxidizing, if the operation is to be carried out submerged. The strip thus adheres very well to said wall or layer.

- means 14a for cooling, if necessary, the strip 9 as-soon as it is applied, in order to resolidify the thermoplastic matrix. It involves, for example, a blast of cold air. It is understood that on a section of pipe for transporting pressurized gas whose temperature is −10° C. for example, the use of cooling means is not required.

- means 15 for measuring the temperature of the point of the peripheral surface of the pipeline 2, possibly already covered with one or several layers of strip, onto which the strip is to be laid down, and means (not shown) for adjusting the heating power of the heating means 14 as a function of the measured temperature so as to provide the conditions for optimum adherence of the strip to said peripheral surface or to the previously laid-down strip covering the latter. It involves, for example, a temperature probe of any type whatsoever.

- means 16, for example a roller or a teflon-coated roll, both independent of the system for adjusting the winding tension, for pressing the flexible strip 9 against the peripheral wall of the pipeline 2 just after applying said strip 9 to said wall. This pressure causes the material of the matrix to flow slightly, which joins the adjacent turns to one another and ensures leak-tightness of the pipeline.

It should be noted that the angle guide 13 may be located either in the heating zone of the strip 9, or in the cold zone located upstream of the heating zone with respect to the direction of travel of the strip. The angle guide 13 and the heating means 14 are adjustable so as to be able to be matched to the winding conditions and in particular to the diameter of the pipeline 2.

The speed of longitudinal displacement of the sub-assembly 42 along the pipeline 2 is adjusted as a function of the coiling angle which is to be obtained.

The flexible strip 9 of very high longitudinal mechanical strength is made up of continuous longitudinal fibers coated in a matrix. The matrix may be metal, for example aluminum, the fibers being made, for example, of steel. The matrix may also and preferably be made from a thermoplastic synthetic resin, the fibers being, for example, glass, carbon, aramid, etc. fibers. The fibers are chosen so that the strip 9 has an elastic limit greater than that of the steel of the pipeline 2. The melting point and/or vitreous transition point of the matrix used are, in all cases, at least 50K less than those of the fibers respectively. Use is generally made of a strip in which the cross section of the fibers represents, in transverse section, from 30 to 60%, and preferably from 40 to 50% of the cross section of the strip.

Before proceeding with winding, the starting end of the flexible strip 9 is fastened at 17, in any known manner whatsoever, for example by bonding, to the peripheral wall of the pipeline 2. This end may also be held in place by the means 16 for pressing the strip or by the first wound turn of the strip.

All that which has been said above for laying down a first layer such as 5a on the external surface of a pipeline 2 is entirely valid for laying down a second layer 5b on the layer 5a, then for laying down a third layer 5c on the layer 5b: the melted material of the strip of the new layer adheres perfectly to the material of the strip of the previous layer, and the leak-tightness of the new layer is ensured by the pressure of the roller 16, as is the elimination of any inclusion.

As represented in detail in FIGS. 2 and 3, the lower layer 5a covers a length of the pipeline 2 greater than those which the successive layers 5b, 5c respectively cover, so that the prestress exerted on the material of the pipeline or container decreases progressively from a predetermined point when moving away from the fault 1 on either side of the latter.

In the embodiment of FIG. 5, a device in accordance with a first embodiment of the invention and indicated generally by the reference number 18 is suspended from a support 19 intended to bear on the ground (or on the seabed). The support 19 may itself be suspended from the hook 20 of a lifting machine, not shown, and receives, via a flexible link 21 connected to an actuation unit on the ground (or on the surface for a sub-sea pipe) all the fluids and information necessary for actuating the device 18. The support 19 comprises all the elements, projectors, cameras, sensors, etc. (not shown), allowing remote control of the device 18 and monitoring of the winding obtained, in particular in the case of a sub-sea pipe. In this latter case, the support 19 may also be arranged so as to serve as diving bell (not shown).

As represented in detail in FIG. 6, the device 18 comprises:

- a chassis 22 intended to bear on the pipeline 2 and if necessary on the ground,
- means 30, 31 for fastening the chassis 22 to the pipeline 2 and centering it with respect to the latter,
- equipment 6 which can move with respect to the chassis 22 and which is intended to revolve with respect to the chassis 22 around the pipeline 2;
- means 27, 28, 29 for causing the moving equipment 26 to revolve around the pipeline 2;
- the moving equipment 26 comprising a winding sub-assembly 42 for supplying and winding a flexible strip 9 around the pipeline 2 under tension when the moving equipment 26 revolves around the latter.

In the example shown, the chassis 22 is made up of two bearing calipers 30 securely fastened respectively to one of two articulated forks 31, and connected by a crossmember 32 carrying a suspension clevis 33 to the support 19 of FIG. 5, for example. The articulated forks 31 each comprise two articulated arms 23 which close around the pipeline 2 under the action of cranks or clevises 24 actuated by thrust cylinders 25 in order to fasten the chassis 22 to the pipeline 2 (see FIGS. 10 and 11).

As represented in detail in FIGS. 10 and 11, these arms 23 may open and close in order to allow the engagement and disengagement of the forks 31 with respect to the pipeline 2.

In their open position represented in solid lines, the thrust cylinders 25, only one of which is represented for the clarity of the drawing, are in the retracted position and the arms 23 are pivoted outward about their respective articulation pin 43 so as to allow the fork 31 to be installed on the pipe 2. The displacement of the thrust cylinders 25 forces the arms 23 to pivot toward their closed position represented in dashed lines. In this closed position, fastening jaws 44 provided on the fork 31 and on the arms 23 are in contact with the pipeline 2. These jaws 44 may be fastened to the fork 31 and to the arms 23, and the fork 31 is then centered on the pipeline by balancing the pressures on the thrust cylinders 25 for maneuvering the arms 23. These jaws 44 may also be mounted on telescopic supports represented diagrammatically at 45 in FIG. 11 and directed radially with respect to the pipeline 2: these supports then allow the fork 31 and the device 18 to be fitted onto a pipeline whose external diameter is distinctly less than the internal diameter of the fork 31, centering being achieved also by balancing the pressures on said supports 45.

These jaws 44, whose surface in contact with the pipeline is advantageously roughened in any known manner whatsoever, for example by knurling or notching, in order correctly to immobilize the fork 31 and the device 18 on the pipeline 2, may be replaced by rollers allowing the device to run along the pipeline, as will be seen later. Use may also advantageously be made of chain-type jaws.

The device 18 of FIG. 6 also comprises, between the caliper 30 and the adjacent fork 31, pivoting blocking jaws 46 each clamped against the pipeline 2 by a thrust cylinder 47 and a crank 47a.

The moving equipment 26 comprises two guide rails 27 having a circular arc-shaped external radial edge and respectively associated with the mutually opposite faces of the two forks 31 of the device 18. Each of these external edges is a rack which bears and meshes at the same time on several rollers 28 belonging to a set of cogged rollers 28 mounted on the fork 31 and at least some of which are drive rollers driven by controlled motors 29, for example hydraulic motors, fastened to the corresponding fork 31. The rollers 28 are distributed substantially evenly over the actual fork 31 and over the arms 23 so that the guide rail 27 is permanently in contact with at least two rollers 28 which drive it in its rotational movement around the pipeline.

The guide rail 27 is, for this reason, fitted with any means whatsoever known per se for holding it on its trajectory in contact with the rollers 28, for example another guide rail or sections of guide rail mounted to overhang, and bearing on other rollers (not shown) fastened to the fork 31.

The outer edge of the guide rail 27 and the rollers 28 may be smooth, in particular for pipelines of relatively small diameter: the pressure of the rollers 28 on this edge is then sufficient to drive the guide rail 27 and the moving equipment 26 rotationally around the pipeline 2.

The guide rails 27 are connected to each other by several pairs of longitudinal slideways 34, 35.

A carriage 36 can move in the longitudinal direction of the pipeline 2 on the two slideways 34 under the action of a ball screw 37 controlled by a two-way motor 38. The carriage 36 carries the winding sub-assembly 42 already described above with reference to FIG. 4, only the pulley 7 of which is represented in the figure for reasons of clarity of the drawing.

The speed of the screw is adjusted as a function of the coiling angle which it is desired to obtain.

Likewise, a carriage 39 which can move on the two slideways 35 under the action of a ball screw 40 carries a presser roll 16, already described with reference to FIG. 4, this roll 16 completing the action of the one which forms part of the winding sub-assembly 42 carried by the carriage 36, or capable of replacing it.

In the embodiment represented in FIG. 7, the elements identical to those described above with reference to FIGS. 4 and 6 carry the same reference numbers as the latter.

In this embodiment, the device 48 comprises a chassis 49 made up of a bearing caliper 50 and an articulated fork 51, connected to each other by centering spacers 52, a crossmember 53 and a suspension clevis 54. The caliper 50 carries thrust cylinders 55 which actuate, by means of cranks 56, blocking jaws 57 which push with force onto the pipeline 2 in order to fasten the device 48 onto the latter. The fork 51 is substantially identical to the fork 31 of FIG. 6, and particularly comprises two articulated arms 23 which close around the pipeline 2. The moving equipment 58 comprises a single guide rail 27 whose circular arc-shaped outer edge forming a rack bears on a set of cogged rollers 28 distributed substantially evenly over the fork 51 and its arms 23 and externally tangential to the rack 27.

The two longitudinal slideways 59 are mounted overhanging the guide rail 27, and support the carriage 36 which can move along the latter under the action of the screw 37. The carriage 36 carries the winding sub-assembly 42 only the braked spool 7 of which has been represented for the clarity of the drawing.

In the embodiment represented in FIG. 8, the device 60 substantially corresponds to two devices such as 18 arranged one behind the other in the longitudinal direction of the pipeline 2.

Two sets of moving equipment 26a, 26b are capable of revolving respectively between the forks 31a and 31b on the one hand, and 31b and 31c on the other hand. The rollers 28 which mesh with the rack of the corresponding guide rail 27 have two-way motors 29. It is therefore possible to make the two sets of moving equipment revolve around the pipeline 2 either in the same direction, or preferably in opposite directions identified respectively by the arrows 61a and 61b: in this latter case, the reaction forces applied respectively to the device 60 due to the rotation of the moving equipment 26a and 26b substantially balance one another out, so that the device 60 does not tend to revolve around the pipeline 2. The arrangement of the winding sub-assembly 42b on the carriage 36b of the moving equipment 26b is, of course, matched to the direction of rotation of the latter (arrow 61b).

The device 60 is capable of being displaced by its own means in the longitudinal direction of the pipeline 2, either in the direction of the arrow 62a, or in the opposite direction indicated by the arrow 62b.

For this purpose, the calipers 30a, 30b and/or the forks 31a, 31b, 31c of the device 60 comprise rollers such as 63 driven by motors, not shown, which serve both to hold the device 60 in place on the pipeline 2 and to displace it longitudinally on the latter. These rollers 63 may be mounted on sprung supports or telescopic supports already described above with reference to FIGS. 10 and 11.

Of course, the rollers 63 may not be driven, the device 60 being displaced along the pipeline 2 by any means whatsoever external to the device 60.

Finally, the device of the invention may also serve to reinforce or to reclaim a section of the pipeline which may comprise bends. These bends are, with respect to the median plan of the pipeline, defined by the axis and the horizontal diameter of the latter at the point of departure of the bend, either bends to the right or to the left, or bends upward or downward, or combinations of the previous bends.

In order to optimize the winding conditions of the strip around bends in the pipeline, the winding sub-assembly 52 is mounted on the carriage 36 so as to be able to move with respect to the latter along five axes: such a mounting, known per se, is represented diagrammatically in FIG. 9. In this figure, the axis 64 of the pipeline 2 and the winding sub-assembly diagrammatically represented by the spool 7 whose rotational axis X–X' is substantially parallel to the axis 64 are represented. The axis Y–Y' corresponds to the horizontal diameter of the spool 7 perpendicular to the axis X–X', and the axis Z–Z' is perpendicular to the two axes X–X' and Y–Y'.

The winding sub-assembly must thus be capable of moving with respect to the carriage (not shown) along each of the three axes X–X', Y–Y', Z–Z' and be capable of revolving around the axis Z–Z' (arrow 65) for bends to the left and to the right, and about the axis Y–Y' (arrow 66) for bends upward and downward, as well as in the respective opposite directions.

The winding sub-assembly may thus be mounted with respect to the carriage, in the same way as a robot wrist is mounted with red, pact to the body of this robot, the various movements being controlled and coordinated by a computer. Such a sub-assembly can be fitted to any one whatsoever of the embodiments of the device of the invention.

Generally, the movements of the elements securely fastened to the calipers 30, 50 and/or the forks 31, 51 are, for example, hydraulically controlled: this relates to the motors 29 of the rollers 28, the thrust cylinders 25 for actuating the articulated arms, the thrust cylinders 47, 55 for actuating the blocking jaws 46, 57, the telescopic supports 45 of the jaws 44, etc.

The energy used on the moving equipment 26, 58, is preferably electrical and is, for example, picked up by means of insulated wipers (not shown) carried by one of the rails 27 and wiping on two insulated rails under tension (not shown) carried by the adjacent face of the corresponding fork 31: this relates in particular to the screws 37, 40 actuating the carriages 36, 39, the actuation of the hot gas blow torch 14, etc.

There will now be described, with reference to the figures, the operational mode of the various aforementioned embodiments of the device of the invention.

Insofar as the device 18 of FIG. 6 is concerned, it is supplied to the pipeline by means of any kind of lifting machine whatsoever, for example the support 19, and it is fastened to the pipeline 2 by means of the jaws 46 and the jaws 44; the motors 29 actuating the rollers 28, which drive the guide rails 27 and the moving equipment 26 rotationally around the pipeline. At the same time and in a coordinated fashion the carriage 36 is displaced along the slideways 34 over the entire length of the latter in order to lay down a first layer of strip such as the strip 5a of FIGS. 2 and 3, covering a zone whose length is at most equal to that of the slideways 34.

The preceding text also applies to the device 48 of FIG. 7.

The device 60 of FIG. 8 is particularly suited to producing a reinforcement over a considerable length of a pipeline. It may comprise more than two sets of moving equipment 26 revolving alternately in one direction and the other in order to lay down, at the same time, whilst advancing, a number of layers of strip equal to the number of sets of moving equipment. The device 60 is normally displaced along the pipe, the carriages 36 being fastened to the longitudinal slideways.

A method and a device are thus being described which are alone in making it possible to carry out repairs on high-pressure primary networks for transporting fluids such as, for example, petroleum products or natural gas.

Of course, the invention is not limited to the embodiments which have just been described, and numerous changes and modifications can be made to the latter without departing from the scope of the invention.

The calipers 30, 50, the articulated forks 31, 51, the longitudinal slideways 34, 35, 59, the ball screws 37, 40, the arms 23, the thrust cylinders 25, 55, the fastening jaws 44, the telescopic supports 45, the jaws 46, etc., and in general all the constituent elements of the devices described may thus be replaced by equivalent means fulfilling comparable functions. These elements may equally well be combined in order to fulfil the various functions described above for fastening and displacing the device along the pipeline, rotating the moving equipment with respect to the chassis and to the pipeline, displacing the carriage with respect to the chassis.

Likewise, the device 60 of FIG. 8 may be equipped with moving equipment 26a, 26b which does not comprise slideways 34a, 34b, 35a, 35b the carriages 36a, 36b may be fastened to the corresponding guide rail 27.

In contrast, each set of moving equipment such as 26 or 58 may comprises several carriages each carrying a winding sub-assembly, or a single carriage carrying several winding sub-assemblies, such as 42, so as to wind several strips at the same time.

There may also be designed, for wavy pipeline outlines, individual chassis, each carrying a set of moving equipment, articulated with respect to one another to allow several layers to be wound whilst advancing, even for wavy outlines.

The devices described may also be adapted to systems forming a diving bell to allow the implementation of the invention out of the water on sub-sea pipelines. Under such conditions, the device may be adapted to automatic, remote-controlled operation. Thus, the spool 7 may comprise a motor in order to supply the strip, and the winding sub-assembly may comprise guides for supplying the strip between the braking rollers, in front of the blow torch and as far as the pipeline, as well as a guillotine in order to be able to cut the strip in the case of an incident and to recommence the winding process under good conditions.

It is possible to mount on the carriage 36, instead of or beside the winding sub-assembly 42, sub-assemblies allowing other operations such as the addition of blocking-off material, the surfacing of this material after laying down, the application of the primary binding coating, the removal of the initial protection or ballast materials before repair, etc.

Generally, the device of the invention may be supported entirely by the pipeline or container to be repaired. It may, in contrast, be suspended from a carrying machine such as 19 (FIG. 5) which may itself be immobile or, to the contrary, be self-propelled, its legs being, for example, equipped with caterpillar tracks or wheels. The device of the invention could equally well rest on the ground by means of its own support means, such as adjustable feet, if appropriate fitted with displacement means such as wheels or caterpillar tracks to make the device self-propelled.

Finally, all the preceeding text relates to the helical winding of a strip in successive segments as a helix. The method and the device of the invention may equally well use another winding process making it possible to cover a substantially cylindrical surface completely: they may thus make use of a process in which one or more spools are stored on the pipeline to be covered without revolving around the latter; the corresponding strips are brought longitudinally as far as a set of moving equipment which alternately revolves in one direction then the other, each time by more than a revolution, in order completely to cover, in one or more passes, the entire surface of the pipeline: it also being possible to use several sets of moving equipment at the same time in order to lay several layers one above the other in the same operation.

I claim:

1. In a method for repairing a fault in a hollow tubular member adapted to contain a fluid under pressure, comprising the following steps:

a) securing to a hollow tubular member having a fault to be repaired, adjacent said fault, one end of a flexible tape consisting of continuous longitudinal fibers that occupy from 30–60% of the cross section of the tape, said fibers being encased in a thermoplastic matrix, the elastic limit of the material of the fibers being greater than the elastic limit of the material of the tubular member;

b) unwinding the tape from a coiled supply of the tape that revolves around the tubular member and is displaced axially along the tubular member;

c) braking the tape between the tubular member and said coiled supply at a point that revolves with said coiled supply and that is spaced from said coiled supply thereby to impart to the tape a substantially greater tension between said point and said tubular member than between said coiled supply and said point;

d) heating the tape immediately prior to applying it to the tubular member, in order to make the thermoplastic material of the matrix melt throughout its entire mass, and to provide conditions for optimum adherence of the tape to the tubular member or to a previously laid-down tape covering said tubular member; and e) applying the tape to the tubular member or a previously laid-down tape covering said tubular member, in order to wind under tension the tape around the tubular member in a helix and cover said fault and to impart to the tubular member by the tape a predetermined prestress;

the improvement comprising the following additional steps:

f) cooling the tape immediately following its application to the tubular member by applying to the tape a blast of cold air, in order to resolidify the thermoplastic matrix and to prevent migration of the fibers through the thermoplastic matrix; and g) creating on the tubular member, on both sides of the repaired fault, transition sections extending over a predetermined length and on which a prestress is produced which decreases progressively when moving away from the repaired section, by reducing the tension of the tape.

2. The method as claimed in claim 1, further comprising inserting blocking material in said fault in said tubular member prior to application of said tape.

3. The method as claimed in claim 2, wherein said blocking material extends radially outwardly of the tubular member prior to said application of the tape.

4. The method as claimed in claim 1, further comprising applying to the tape a solid member to press the tape radially inwardly of the tubular member immediately after the tape is applied to said tubular member.

5. The method as claimed in claim 1, wherein said tape is a flexible strip consisting of an aluminum matrix in which fibers of steel are encased.

6. In apparatus for repairing a fault in a hollow tubular member adapted to contain a fluid under pressure, comprising a) means for securing to a hollow tubular member having a fault to be repaired, adjacent said fault, one end of a flexible tape consisting of continuous longitudinal fibers that occupy from 30–60% of the cross section of the tape, said fibers being encased in a thermoplastic matrix, the elastic limit of the material of the fibers being greater than the elastic limit of the material of the tubular member;

b) means for unwinding the tape from a coiled supply of the tape that revolves around the tubular member and is displaced axially along the tubular member;

c) means for braking the tape between the tubular member and said coiled supply at a point that revolves with said coiled supply and that is spaced from said coiled supply thereby to impart to the tape a substantially greater tension between said point and said tubular member than between said coiled supply and said point;

d) means for heating the tape immediately prior to applying it to the tubular member, in order to make the thermoplastic material of the matrix melt throughout its entire mass, and to provide conditions for optimum adherence of the tape to the tubular member or to a previously laid-down tape covering said tubular member; and e) means for applying the tape to the tubular member or a previously laid-down tape covering said tubular member, in order to wind under tension the tape around the tubular member in a helix and cover said fault and to impart to the tubular member by the tape a predetermined prestress;

the improvement comprising f) means for cooling the tape immediately following its application to the tubular member by applying to the tape a blast of cold air, in order to resolidify the thermoplastic matrix and to prevent migration of the fibers through the thermoplastic matrix; and g) means for creating on the tubular member, on both sides of the repaired fault, transition sections extending over a predetermined length and on which a prestress is produced which decreases progressively when moving away from the repaired section, by reducing the tension of the tape.

7. Apparatus as claimed in claim 6, further comprising a solid member applicable to the tape to press the tape radially inwardly of said tubular member immediately after the tape is applied to said tubular member.

8. Apparatus as claimed in claim 6, wherein said tape is a flexible strip consisting of an aluminum matrix coating fibers of steel.

* * * * *